US012444879B2

(12) United States Patent
Morello et al.

(10) Patent No.: US 12,444,879 B2
(45) Date of Patent: Oct. 14, 2025

(54) STRAIN RELIEF DEVICE FOR ELECTRICAL CONNECTORS

(71) Applicant: Aptiv Technologies AG, Schaffhausen (CH)

(72) Inventors: John Morello, Warren, OH (US); James M. Rainey, Warren, OH (US)

(73) Assignee: APTIV TECHNOLOGIES AG, Schaffhausen (CH)

( * ) Notice: Subject to any disclaimer, the term of this patent is extended or adjusted under 35 U.S.C. 154(b) by 307 days.

(21) Appl. No.: 17/989,039

(22) Filed: Nov. 17, 2022

(65) Prior Publication Data

US 2023/0198198 A1 Jun. 22, 2023

Related U.S. Application Data

(60) Provisional application No. 63/290,820, filed on Dec. 17, 2021.

(51) Int. Cl.
*H01R 13/58* (2006.01)

(52) U.S. Cl.
CPC ................................ *H01R 13/5825* (2013.01)

(58) Field of Classification Search
CPC ............ H01R 13/5825; H01R 13/5812; H01R 13/501; H01R 13/50
USPC .......................................................... 439/460
See application file for complete search history.

(56) References Cited

U.S. PATENT DOCUMENTS

| | | | |
|---|---|---|---|
| 9,825,445 B2 | 11/2017 | Metzler et al. | |
| 10,290,970 B1 | 5/2019 | Weber et al. | |
| 10,490,932 B1 * | 11/2019 | Schneider ............ | H01R 13/582 |
| 10,573,988 B2 | 2/2020 | Mellott et al. | |
| 2008/0318460 A1 * | 12/2008 | Hsieh .................. | H01R 13/426 439/345 |
| 2017/0149170 A1 | 5/2017 | Tait | |

FOREIGN PATENT DOCUMENTS

| | | | |
|---|---|---|---|
| EP | 3457501 A1 | 3/2019 | |
| JP | H0357176 A | 3/1991 | |
| JP | H0766839 B2 * | 7/1995 | ............ H01R 13/58 |

OTHER PUBLICATIONS

"Extended European Search Report Received mailed on May 4, 2023", 13 Pages.
"Communication Pursuant to Article 94(3) EPC mailed on Apr. 30, 2025", 9 Pages.

* cited by examiner

*Primary Examiner* — Tulsidas C Patel
*Assistant Examiner* — Jeffrey Mountain
(74) *Attorney, Agent, or Firm* — Billion & Armitage

(57) ABSTRACT

A terminal assembly includes a connector housing having an opening at a first end for receiving a cable and a strain relief device. The opening of the connector housing is defined by an inner surface. The strain relief device includes an annular base and a cylindrical portion extending from the annular base, wherein the cylindrical portion has an inner surface having a diameter selected to surround the cable and an outer surface having an outer diameter configured to fit within the opening of the connector housing.

13 Claims, 3 Drawing Sheets

STRAIN RELIEF DEVICE FOR ELECTRICAL CONNECTORS

CROSS-REFERENCE TO RELATED APPLICATIONS

This application claims benefit of U.S. Provisional Application No. 63/290,820, filed on Dec. 17, 2021. U.S. Provisional Application No. 63/290,820 is incorporated herein by reference. A claim of priority is made.

TECHNICAL FIELD

The invention relates generally to strain relief devices and in particular to strain relief devices utilized with electrical connectors.

BACKGROUND

Electrical connectors receive an electrical cable or wire via a port and include internal components for making an electrical connection between the electrical connector and the cable. To prevent low tensile forces from damaging the cable, strain relief devices may be secured to the cable and to the electrical connector.

The functional principle of strain relief for a connecting line is generally based on fixing the connecting line in a clamping manner by joining together housing parts or by tightening a mechanical fastener (e.g., screw) connection to the housing.

SUMMARY

According to some aspects, a terminal assembly includes a connector housing having an opening at a first end for receiving a cable and a strain relief device. The opening of the connector housing is defined by an inner surface. The strain relief device includes an annular base and a cylindrical portion extending from the annular base, wherein the cylindrical portion has an inner surface having a diameter selected to surround the cable and an outer surface having an outer diameter configured to fit within the opening of the connector housing.

According to another aspect, a strain relief device includes a first portion and a second portion. The first portion includes a first semi-annular base, a first semi-cylindrical portion extending away from the first semi-annular base, and a first arm extending from the first semi-annular base. The first semi-cylindrical portion includes an inner surface having a diameter selected to surround a cable and an outer surface having an outer diameter configured to fit within a connector housing. The first arm is configured to extend over an outer surface of the connector housing and engage with a first locking feature located on the outer surface of the connector housing. The second portion likewise includes a second semi-annular base, a second semi-cylindrical portion extending away from the second semi-annular base, and a second arm extending from the second semi-annular base. The second semi-cylindrical portion includes an inner surface having a diameter selected to surround the cable and an outer surface having an outer diameter configured to fit within the connector housing. The second arm is configured to extend over the outer surface of the connecting housing and engage with a second locking feature located on the outer surface of the connector housing.

According to another aspect, c method of installing a strain relief device includes placing the strain relief device in a position at least approximately surrounding a cable connected to a terminal assembly, wherein the cable enters the terminal assembly via an opening defined by an inner surface of a connector housing. The method further includes inserting a cylindrical portion of the strain relief device into the opening defined by the inner surface of the connector housing, wherein insertion of the strain relief device provides clamping force between the strain relief device and the cable.

DETAILED DESCRIPTION

According to some aspects, a terminal assembly includes a connector housing having an opening configured to receive a cable. A strain relief device includes an annular base and a cylindrical portion extending from the annular base, wherein the cylindrical portion has an inner surface having a diameter selected to surround the cable and an outer surface having an outer diameter configured to fit within the opening of the connector housing. Engagement of the strain relief device within the opening of the connector housing generates a clamping force between the strain relief device and the cable. The clamping force limits movement between not only the cable and the strain relief device, but also between the cable and the connector housing.

Figure 1:
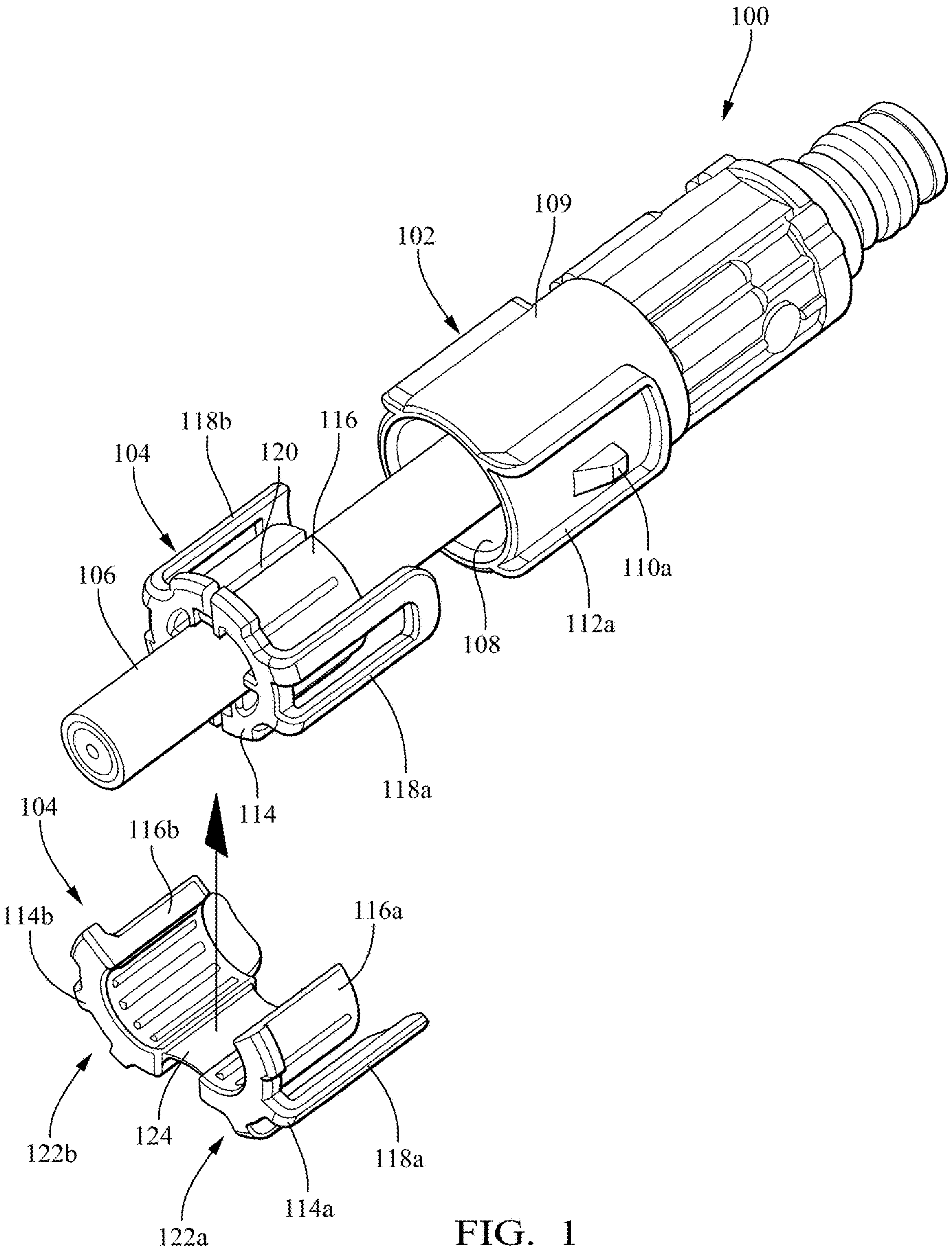
FIG. 1 is an isometric view of a strain relief device prior to installation within a connector housing according to some embodiments.
Figure 2:
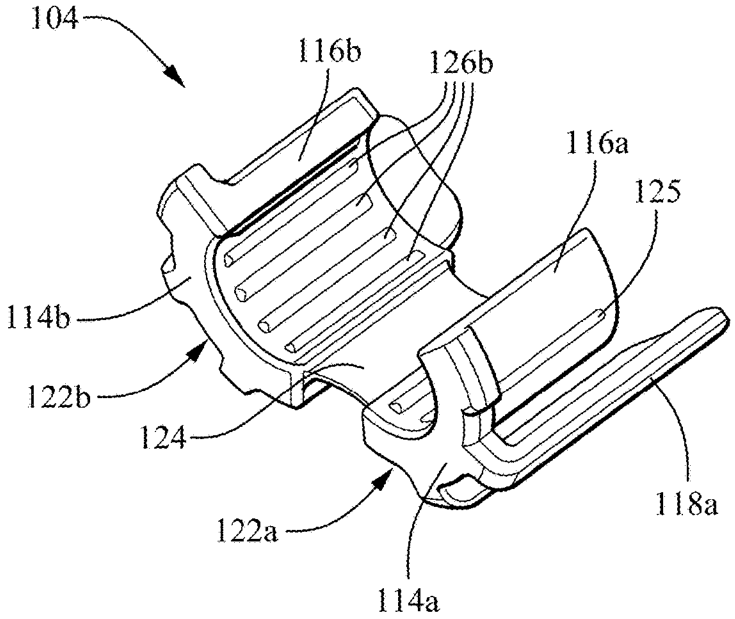
FIG. 2 is an isometric view of the strain relief device shown in FIG. 1 in an open position prior to installation around the cable according to some embodiments.

Referring to FIGS. 1 and 2, a strain relief device 104 is provided for use with a terminal assembly 100. In particular, FIG. 1 is an isometric view of a strain relief device 104 in a closed position around a cable 106 prior to installation within a terminal assembly 100, and FIG. 2 is a magnified view of the strain relief device 104 in an open position prior to being closed around a cable 106 according to some embodiments.

As shown in FIG. 1, the terminal assembly 100 includes a connector housing 102 configured to receive a cable 106 and a strain relief device 104. The connector housing 102 includes an inner surface 108 that defines an opening that receives both the cable 106 and a portion of the strain relief device 104. According to some embodiments, the connector housing 102 further includes an outer surface 109 that includes one or more locking features 110*a*, 110*b* and protection features 112*a*, 112*b*. In some embodiments, cable 106 includes one or more conductors surrounded by one or more layers of insulation and jackets. In general, the outer layer of the cable 106 is a jacket or similar insulative material. For purposes of this discussion, the outer surface of the cable is referred to generically as the cable 106.

In some embodiments, the strain relief device 104 is a single unit comprising a first portion 122*a* and a second portion 122*b* connected together by a flexible hinge 124 as shown in FIG. 2. During installation, the strain relief device 104 is placed around the cable 106 and the first portion 122*a* and second portion 122*b* are brought together as shown in FIG. 1. When in the installed position, the first portion 122*a* and second portion 122*b* can be described as comprising an annular base portion 114, a cylindrical portion 116, and first and second arms 118*a*, 118*b*, although the annular base portion 114 and cylindrical portion 116 include an opening or gap 120 extending between the respective first portion 122*a* and second portion 122*b*. That is, the first portion 122*a* includes a semi-annular base portion 114*a*, semi-cylindrical portion 116*a*, and first arm 118*a*. Likewise, the second portion 122*b* includes a semi-annular base portion 114*b*, semi-cylindrical portion 116*b*, and second arm 118*b*.

During installation, the strain relief device 104 is closed over the cable 106 as shown in the top portion of FIG. 1. As discussed in more detail below, there is no requirement for interlocking or clasping the first portion 122*a* and the second portion 122*b*. The desired clamping force exerted by the strain relief device 104 onto the cable 106 is a function of the installing the cylindrical portion 116 within the opening of the connector housing 102 (as shown FIGS. 3-5). In other embodiments, rather than a unitary strain relief device 104 comprising first and second portions 122*a*, 122*b* connected by a hinged portion 124, the strain relief device 104 may comprise two separate portions unconnected to one another (for example, as shown in FIG. 3).

Having placed the strain relief device 104 in a position surrounding the cable 106 the strain relief device 104 is brought into connection with the connector housing 102. In particular, the cylindrical portion 116 is inserted within the opening defined by the inner surface 108 of the connector housing 102 and the first and second arms 118*a*, 118*b* (each having locking features) are brought into contact with locking features 110*a*, 110*b*, respectively, located on the outer surface 109 of the connector housing 102. In the embodiment shown in FIGS. 1 and 2, the first and second arms 118*a*, 118*b* include an opening or hoop configured to receive the locking features 110*a*, 110*b* (i.e., locking protrusions) located on the outer surface 109 of the connector housing 102. In particular, the outer surface of the cylindrical portion 116 is brought into contact with the inner surface 108 of the connector housing 102, generating a radial inward clamping force between the strain relief device 104 and the cable 106. In the embodiment shown in FIGS. 1 and 2, a plurality of axial rails 125 are provided on the outer surface of the cylindrical portion 116 of the strain relief device 104. In some embodiments, the axial rails 125 are deformable, such that exertion of force by a technician to insert the cylindrical portion 116 within the opening of the connector housing 102 results in deformation of the axial rails 125 by the inner surface 108 of the connector housing 102. In some embodiments, the outer diameter defined by the axial rails 125 may be approximately equal to or greater than the diameter of the opening defined by the inner surface 108 of the connector housing 102 to ensure generation of a radial inward force.

In some embodiments, the strain relief device 104 further includes a plurality of cable retaining ribs 126*b* located on an inner surface of the cylindrical portion 116. In the embodiment shown in FIGS. 1 and 2, the cable retaining ribs 126*b* are oriented in an axial direction. However, in other embodiments the cable retaining ribs 126*b* may be oriented in a radial direction as a plurality of concentric ribs positioned along the inner surface of the cylindrical portion 116. In some embodiments, application of a radial inward force as the strain relief device 104 is inserted within the connector housing 102 causes the plurality of cable retaining ribs 126*b* to be pressed into the jacket of the cable 106. In some embodiments, this prevents rotation of the cable 106 within the connector housing 102 in response to external forces. As discussed above, placement of the strain relief device 104 over the cable 106 does not provide clamping force. The insertion of the strain relief device 104 (surrounding the cable 106) within the opening of the connector housing 102 provides the desired clamping force between the strain relief device 104 and the cable 106. This clamping force reduces movement between the cable 106 and the strain relief device 104. In addition, the depth of insertion of the cylindrical portion 116 within the opening of the connector housing 102 (described in more detail with respect to FIG. 5) and fit between the cylindrical portion 116 and the connector housing 102 prevents movement between the strain relief device 104 and the connector housing 102.

Figure 3:
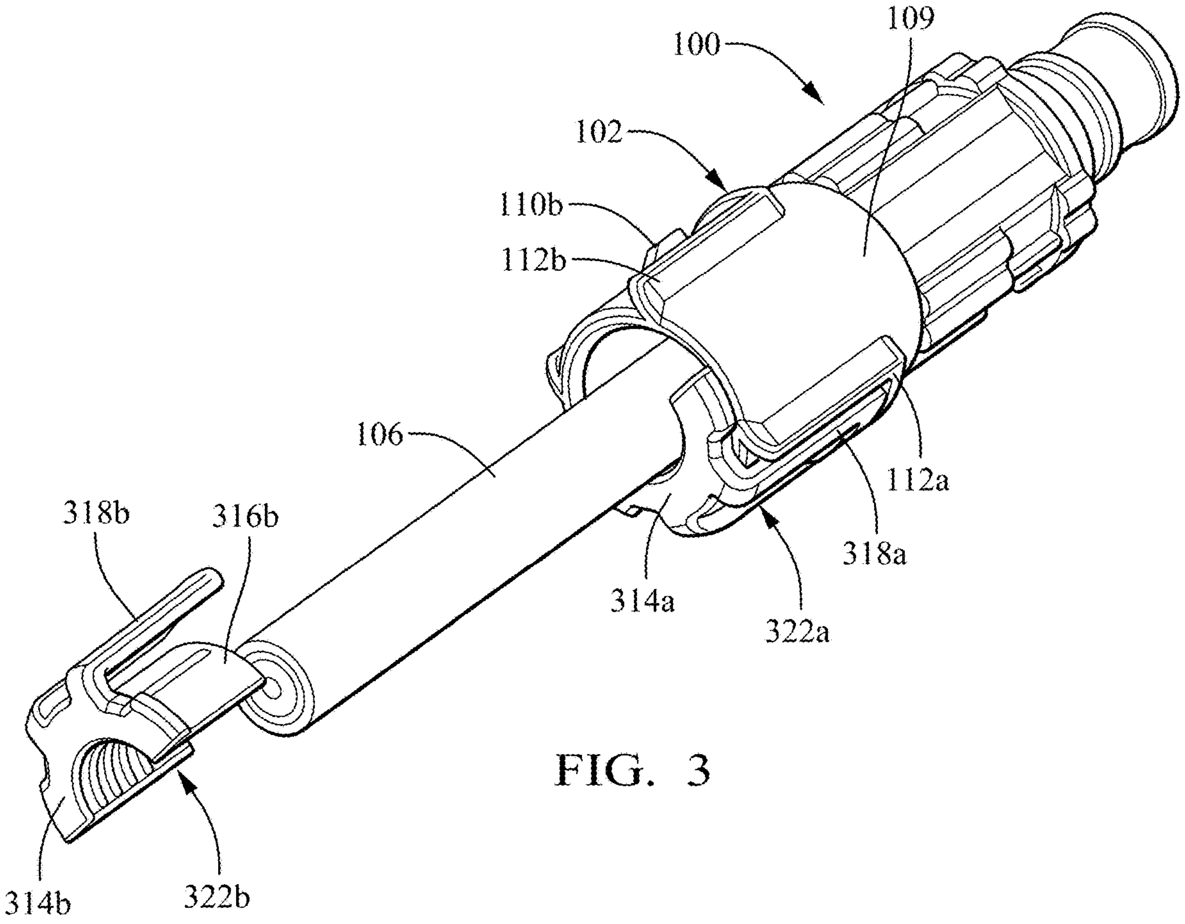
FIG. 3 is an isometric view of a two-part strain relief device partially installed within a connector housing according to some embodiments.
Figure 4:
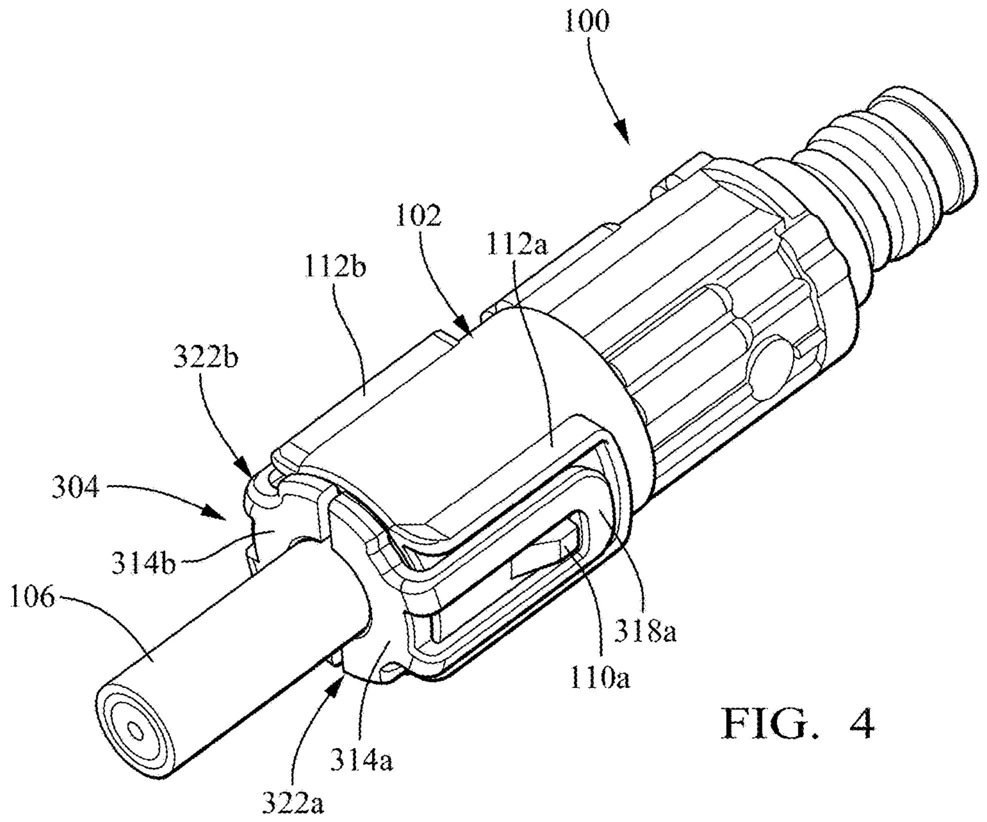
FIG. 4 is an isometric view of a strain relief device installed within a connector housing according to some embodiments.

Referring to FIGS. 3 and 4, an embodiment is shown in which strain relief device 304 is a two-part device comprising first portion 322*a* and second portion 322*b*. In the isometric view shown in FIG. 3, the first portion 322*a* is in the installed position within the connector housing 102 while the second portion 322*b* is in the uninstalled position outside of the connector housing 102. In the isometric view shown in FIG. 4, both the first portion 322*a* and the second portion 322*b* are in the installed position.

As shown in FIG. 3, the cylindrical portion (not shown) of the first portion 322*a* is installed within the opening of the connector housing 102 and first arm 318*a* is positioned over the outer surface 109 of the connector housing 102 such that the first arm 318*a* is interlocked with the locking feature 110*a* (not visible in this view). In some embodiments, the locking features 110*a*, 110*b* are comprised of protrusions extending from the outer surface 109 and configured to interact with openings located on the respective first and second arms 318*a*, 318*b* (or 118*a*, 118*b* as shown in FIGS. 1 and 2). During installation, the first arm 318*a* slides over the top of the locking feature 110*a* (or protrusions) until the opening located within the first arm 318*a* reaches the locking feature 110*a*, allowing the first arm 318*a* to snap/spring into place and preventing axial movement of the first arm 318*a*. In this way, first and second arms 318*a*, 318*b* (as well as first and second arms 118*a*, 118*b* shown in FIGS. 1 and 2) prevent axial movement and removal of the strain relief device 304 (or 104, shown in FIGS. 1 and 2) from the connector housing 102 once installed. In some embodiments, a protective feature 112*a*, 112*b* is also provided on the outer surface 109 of the connector housing 102 and is configured to surround the portion of the outer surface 109 configured to receive the first and second arms 318*a*, 318*b*, respectively. In some embodiments, the protective features 112*a*, 112*b* prevent accidental release of the first and second arms 318*a*, 318*b*.

In the embodiment shown in FIG. 3, the first and second portions 322*a*, 322*b* include concentric cable retaining ridges (not labeled) located on the inner surface of the cylindrical portions 316*a*, 316*b*. This is in contrast to the axially extending cable retaining ridges 126*b* shown in FIG. 2. In addition, the outer surface of the cylindrical portions 316*a*, 316*b* include axial rails (not labeled). The first and second portions 322*a*, 322*b* also include semi-annular base portions 314*a*, 314*b*.

As illustrated in FIGS. 3 and 4, the first portion 322*a* and the second portion 322*b* of the strain relief device 304 are not connected to one another. As described above with respect to FIGS. 1 and 2, the first and second portions 322*a*, 322*b* of the strain relief device 304 do not require interlocking to generate the desired radial forces. Rather, the camming action required to insert the strain relief device 304—and in particular the cylindrical portions 316*a*, 316*b* of the strain relief device 304—within the connector housing 102 generates the desired radial forces to provide a clamping action of the strain relief device 304 onto the cable 106. First and second arms 318*a*, 318*b* and corresponding locking features 110*a*, 110*b* located on the outer surface 109 of the connector housing 102 prevent the strain relief device 304 from moving in an axial direction after being installed.

Figure 5:
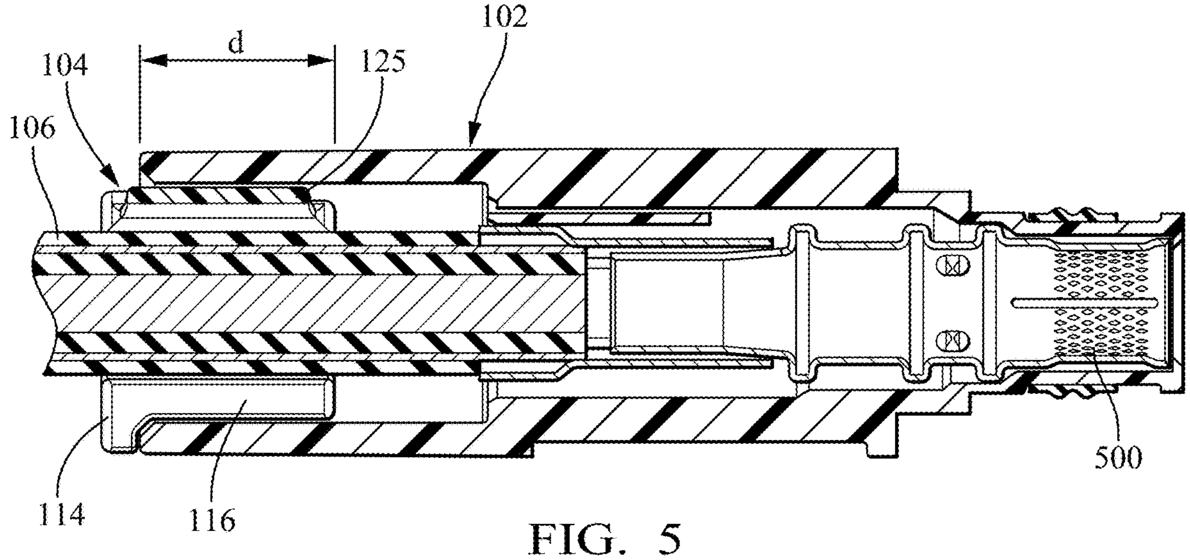
FIG. 5 is a cross-sectional view of the strain relief device installed within a connector housing according to some embodiments.

FIG. 5 is a cross-sectional view of the strain relief device 104 (shown in FIGS. 1 and 2) installed within the connector housing 102 according to some embodiments. As shown in this view, the cylindrical portion 116 extends within the opening of the connector housing 102. The axial depth of insertion of the cylindrical portion 116—defined as the bearing surface—determines the clamping force applied between the strain relief device 104 and the cable 106. In some embodiments, the insertion depth d of the cylindrical portion 116 within the opening of the connector housing 102 is selected to limit angular movement of the strain relief device 104 relative to the connector housing 102. In some embodiments, the insertion depth required to limit angular movement is a function of the fit and/or tolerance between the cylindrical portion 116 and the opening of the connector housing 102. For example, a tighter fit between the cylindrical portion 116 and the opening of the connector housing 102 may reduce the insertion depth required to prevent angular movement of the strain relief device 104 relative to the connector housing 102. In some embodiments, the insertion depth is on the order of several millimeters, but in other embodiments may utilize various insertion depths. In this way, insertion of the strain relief device 104 within the opening of the connector housing 102 generates a clamping force that prevents movement between the cable 106 and the strain relief device 104. The clamping force and the insertion depth d of the cylindrical portion 116 within the opening of the connector housing 102 prevents angular movement between the strain relief device 104 and the connector housing 102, and therefore between the cable 106 and the connector housing 102.

In some embodiments, the diameter of the annular base portion 114 is greater than the diameter of the opening defined by the inner surface 108 of the connector housing 102. In the embodiment shown in FIG. 5, one of the plurality of axial rails 125 located on an outer surface of the cylindrical portion 116 is shown in engagement with the inner surface 108 of the connector housing 102. Engagement of the axial rail 125 with the inner surface 108 of the connector housing 102 causes deformation of the axial rail 125, resulting in the generation of a clamping force distributed evenly along the bearing surface of the strain relief device 104. This clamping force is provided between the strain relief device 104—in particular the cylindrical portion 116 of the strain relief device 104—and the cable 106.

In some embodiments, a seal (not shown) may be located within the opening/cavity defined by the inner surface 108 of the connector housing 102, located axially inward (i.e., to the right in the view shown in FIG. 5) of the strain relief device 104. In some embodiments, the seal prevents water/contaminants from reaching the terminal connection 500. In addition, the strain relief device 106 acts as a seal retainer within the connector housing 102.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A terminal assembly comprising:

a connector housing having an opening at a first end for receiving a cable, the opening having an inner surface defined by a housing inner diameter; and a strain relief device having an annular base and a cylindrical portion extending from the annular base, the cylindrical portion having an inner surface having a diameter selected to surround the cable and an outer surface having an outer diameter configured to fit within the opening of the connector housing, the fit between the cylindrical portion of the strain relief device and the inner surface of the connector housing generating a clamping force between the strain relief device and the cable, the strain relief device including a plurality of ribs extending axially along the outer surface of the cylindrical portion, the plurality of ribs configured to deform due to exertion of force by the inner surface of the connector housing on the plurality of ribs generated by inserting the cylindrical portion within the opening of the connector housing.

2. The terminal assembly of claim 1, wherein the strain relief device further includes first and second arms extending from the annular base, wherein the first and second arms extend over an outer surface of the connector housing and engage with locking features located on the outer surface of the connector housing.

3. The terminal assembly of claim 2, wherein the first and second arms including locking hoops configured to slide over and engage locking nips provided on the outer surface of the connector housing.

4. The terminal assembly of claim 1, wherein the strain relief device includes a plurality of axial rails extending axially along the inner surface of the cylindrical portion.

5. The terminal assembly of claim 1, wherein the strain relief device includes a plurality of radial rails extending around the inner surface of the cylindrical portion.

6. The terminal assembly of claim 1, wherein the strain relief device includes an axial hinge located along an axial length of the strain relief device, wherein the strain relief device is divided into a first portion and a second portion connected by the axial hinge.

7. The terminal assembly of claim 1, wherein the strain relief device is a two-part device divided along an axial length of the cylindrical portion, wherein a first part includes a first arm configured to extend over an outer surface of the connector housing and engage with a first locking feature located on the outer surface of the connector housing, and wherein a second part includes a second arm configured to extend over the outer surface of the connector housing and engage with a second locking feature.

8. A strain relief device comprising:

a first portion comprising:

a first semi-annular base;

a first semi-cylindrical portion extending away from the first semi-annular base, the first semi-cylindrical portion having an inner surface having a diameter selected to surround a cable and an outer surface having an outer diameter configured to fit within a connector housing; and a first arm extending from the first semi-annular base, wherein the first arm is configured to extend over an outer surface of the connector housing and engage with a first locking feature located on the outer surface of the connector housing;

a second portion comprising:

a second semi-annular base;

a second semi-cylindrical portion extending away from the second semi-annular base, the second semi-cylindrical portion having an inner surface having a diameter selected to surround the cable and an outer surface having an outer diameter configured to fit within the connector housing; and a second arm extending from the second semi-annular base, wherein the second arm is configured to extend over the outer surface of the connecting housing and engage with a second locking feature located on the outer surface of the connector housing, the first and second portions each including a plurality of ribs extending axially along the outer surfaces of the first and second semi-cylindrical portions, the plurality of ribs configured to deform due to exertion of force by the inner surface of the connector housing on the plurality of ribs generated by inserting the first and second semi-cylindrical portions within the connector housing.

9. The strain relief device of claim 8, wherein the first portion and the second portion are connected by a hinge.

10. The strain relief device of claim 9, wherein the hinge extends between a first axial length of the first semi-cylindrical portion and a second axial length of the second semi-cylindrical portion.

11. The strain relief device of claim 8, wherein the strain relief device includes a plurality of axial rails extending axially along the inner surfaces of the first and second semi-cylindrical portions.

12. A method of installing a strain relief device, the method comprising:

placing the strain relief device in a position at least approximately surrounding a cable connected to a terminal assembly, wherein the cable enters the terminal assembly via an opening defined by an inner surface of a connector housing; and inserting a cylindrical portion of the strain relief device into the opening defined by the inner surface of the connector housing, wherein insertion of the strain relief device provides clamping force between the strain relief device and the cable, wherein the strain relief device including a plurality of ribs extending axially along the outer surface of the cylindrical portion; and deforming the plurality of ribs due to an exertion of force by the inner surface of the connector housing on the plurality of ribs generated during the previous step.

13. The method of claim 12, wherein inserting the cylindrical portion of the strain relief device into the opening includes inserting first and second arms along an outer surface of the connector housing to engage the first and second arms with locking features located along the outer surface of the connector housing.

* * * * *